(12) United States Patent
Kim et al.

(10) Patent No.: US 8,431,870 B2
(45) Date of Patent: Apr. 30, 2013

(54) WIPER BLADE WITH HEATING ELEMENTS AND METHOD FOR CONTROLLING THE WIPER BLADE

(75) Inventors: In Kyu Kim, Gyeonggi-do (KR); Young Hoon Lee, Gyeonggi-do (KR); Tae Young Kim, Gyeonggi-do (KR)

(73) Assignee: ADM 21 Co., Ltd., Gyeonggi-do (KR)

( * ) Notice: Subject to any disclaimer, the term of this patent is extended or adjusted under 35 U.S.C. 154(b) by 330 days.

(21) Appl. No.: 12/836,268

(22) Filed: Jul. 14, 2010

(65) Prior Publication Data

US 2011/0248013 A1 Oct. 13, 2011

(30) Foreign Application Priority Data

Apr. 13, 2010 (KR) ........................ 10-2010-0034008

(51) Int. Cl.
*B60L 1/02* (2006.01)
(52) U.S. Cl.
USPC ......................................... 219/203; 219/202
(58) Field of Classification Search .................. 219/202, 219/203
See application file for complete search history.

(56) References Cited

U.S. PATENT DOCUMENTS

| 5,520,453 | A | 5/1996 | Aoki et al. ..................... 312/406 |
| 5,649,337 | A | 7/1997 | Lobner ....................... 15/250.06 |
| 5,826,293 | A | 10/1998 | Holland ....................... 15/250.06 |
| 6,028,291 | A | 2/2000 | Heisler .......................... 219/203 |
| 6,591,443 | B1 | 7/2003 | Gilpin ......................... 15/250.06 |
| 6,678,915 | B1 | 1/2004 | Ravenell ..................... 15/250.07 |
| 6,936,985 | B2 | 8/2005 | Pankey et al. ................. 318/443 |
| 7,345,445 | B2 * | 3/2008 | Huntzicker ................... 318/444 |
| 7,693,630 | B1 | 4/2010 | Mitchell ......................... 701/36 |
| 7,721,382 | B2 | 5/2010 | Malone ...................... 15/250.07 |
| 2009/0100626 | A1 * | 4/2009 | Kim ........................... 15/250.05 |

* cited by examiner

*Primary Examiner* — Matthew E Warren
(74) *Attorney, Agent, or Firm* — Seed IP Law Group PLLC

(57) ABSTRACT

Disclosed is a method for controlling a wiper blade with heating elements embedded therein and coupled to a wiper arm of a vehicle to wipe a glass surface while moving together with the wiper arm. The method includes: detecting the operation or not of an engine of a vehicle; detecting the external temperature outside of the vehicle; and automatically supplying power to the heating elements based on the detected information on the operation of the engine and the temperature information. A wiper blade with heating elements capable of optimally maintaining a condition of the wiper blade even when the external temperature is low is also provided.

8 Claims, 2 Drawing Sheets

WIPER BLADE WITH HEATING ELEMENTS AND METHOD FOR CONTROLLING THE WIPER BLADE

CROSS REFERENCE TO RELATED APPLICATION

This application claims priority from and the benefit of Korean Patent Application No. 10-2010-0034008, filed on Apr. 13, 2010, which is hereby incorporated by reference for all purposes as if fully set forth herein.

BACKGROUND

1. Technical Field

The present invention relates to a wiper blade mounted on a wiper device of a vehicle to wipe a glass surface, and more specifically, to a wiper blade with heating elements capable of optimally keeping a condition of the wiper blade in order to wipe a glass surface even during winter when the external temperature is low by automatically turning-on or turning-off the heating elements embedded in a wiper blade and a method for controlling a wiper blade.

2. Description of the Related Art

As shown in FIG. 1, a wiper device according to the related art includes a wiper arm 9 that rotates left and right by a motor (not shown) disposed in a vehicle and a wiper blade 1 mounted on the wiper arm 9 to move together. The wiper blade 1 includes a rubber strip 2 that wipes a glass surface while moving over the glass surface (not shown) closely.

The wiper blade 1 is coupled with the wiper arm 9 to rotate at a predetermined angle according to the driving of the motor. To this end, the wiper blade 1 according to the related art includes first link members 3 coupled with the wiper arm 9, a plurality of second link members 5 that are coupled with the first link members 3 to uniformly transfer the pressure of the wiper arm 9, and a plurality of third link members 7 that are coupled with the second link members 5 to connect the rubber strip 2.

In this configuration, the second link members 5 adjacent to the rubber strip 2 and the ends of the third link members 7 are provided with clips 5a and 7a, respectively, to couple the rubber strip 2 by being inserted into a rail groove formed in the rubber strip 2.

As described above, the wiper blade 1 according to the related art is formed to flexibly bend the rubber strip 2 along the glass surface of a vehicle by rotatably coupling the plurality of link members 3, 5, and 7 at a predetermined angle to each other.

However, the rubber strip 2 of the wiper blade contracts during winter when the temperature is low, such that it becomes rigidly hardened. Therefore, when the rubber strip 2 is not flexible, the rubber strip 2 does not completely adhere to the glass surface of a vehicle. In particular, both ends of the rubber strip 2 come off the glass surface, such that there is a problem in that the contact area with the glass surface becomes small, etc.

A wipe blade to optimally wipe the glass surface even during the winter when external temperature is low by embedding the heating elements in the wiper blade has been developed. However, the wiper blade with the heating elements according to the related art cannot appropriately control the heating elements and can waste power by supplying power to the heating elements for a longer time than needed, since a driver determines whether the generation of heat of the wiper blade is needed to supply power to the heating elements by inserting a power connection part connected to the heating elements into a cigarette outlet.

BRIEF SUMMARY

In one embodiment, a wiper blade is provided with heating elements capable of appropriately controlling the heating elements and saving energy by automatically supplying power to the heating elements while considering a driving state of a vehicle, external temperature, etc., and a method for controlling the wiper blade.

According to another embodiment of the present invention, there is provided a method for controlling a wiper blade with heating elements embedded therein and coupled to a wiper arm of a vehicle to wipe a glass surface while moving together with the wiper arm, including: detecting the operation or not of an engine of a vehicle; detecting the external temperature outside of the vehicle; and automatically supplying power to the heating elements based on the detected information on the operation of the engine and the temperature information.

According to one embodiment, the operation or not of the engine is detected through the fluctuation in voltage of a battery that is mounted in an engine compartment together with the engine.

According to one embodiment, the fluctuation in voltage of the battery is sensed by a voltage sensing sensor and is transferred to a microcomputer through an external input port in a controller.

According to one embodiment, the temperature information outside the vehicle detected by a temperature sensor is transferred to the microcomputer through the external input port in the controller.

According to one embodiment, the information on the operation of the engine and the temperature information are transferred to the microcomputer in the controller and the microcomputer determines whether a switch is turned-on through the operation information and the temperature information.

According to one embodiment, the switch is automatically turned-off by sensing when a predetermined time elapses after the operation of the heating element or when the operation of the engine stops to end the operation of the heating element.

According to one embodiment, the operation state of the heating element is displayed through a display device recognizably installed on the outside of the wiper blade.

According to another embodiment of the present invention, there is provided a wiper blade including a rubber strip that contacts a glass surface to wipe the glass surface, a frame that is coupled with the rubber strip, and an adaptor that is coupled with the frame to connect to a wiper arm of a vehicle and wiping the glass surface while moving together with the wiper arm of the vehicle, the wiper blade comprising: a heating element that is embedded in the wiper blade and whose generation of heat is controlled by the control method.

In one embodiment, the heating element is supplied with power from a battery installed in an engine compartment of the vehicle.

DETAILED DESCRIPTION

Hereinafter, exemplary embodiments of the present invention will be described in detail with reference to the accompanying drawings.

Figure 2:
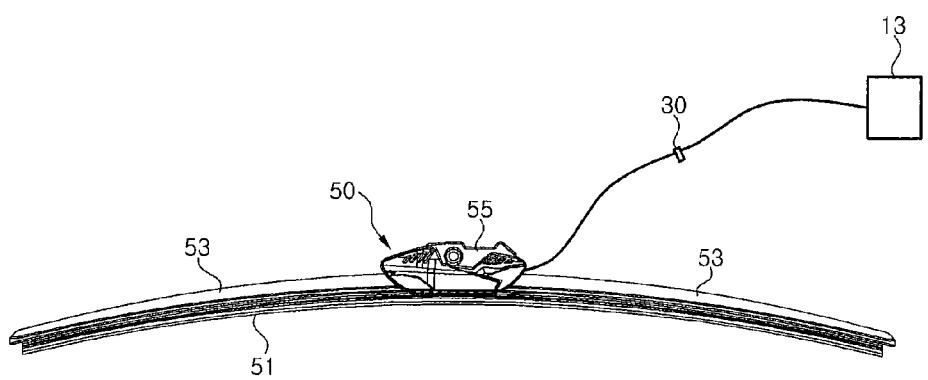
FIG. 2 is a conceptual diagram of a wiper blade with heating elements according to one embodiment of the present invention.

As shown in FIG. 2, a wiper blade with heating elements according to an exemplary embodiment of the present invention includes a strip 51 made of a rubber material to wipe a glass surface while closely moving over a glass surface, a frame (not shown) coupled with the rubber strip 51, and an adaptor 55 that is disposed at the center of the frame to be able to connect the wiper blade to a wiper arm (not shown).

Further, according to the exemplary embodiment of the present invention, spoilers 53 may each be coupled left and right on the frame of the wiper blade based on the adaptor 55, thereby making it possible to prevent the wiper blade from coming off the glass surface during the driving of a vehicle.

Figure 1:
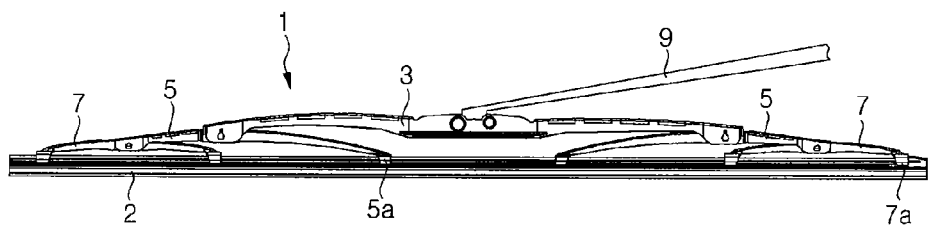
FIG. 1 is a front view of a wiper blade according to the related art.

Although the shape and configuration of the wiper blade 50 is described above, the method for controlling the wiper blade according to the present invention is not limited by the type of wiper blade and thus, may be applied to the wiper blade according to the related art as shown in FIG. 1.

As the rubber strip 51, one similar to the rubber strip 2 of the related art shown in FIG. 1 may be used. The frame presses the rubber strip 51 to the glass surface with a predetermined elastic force so that the rubber strip 51 is closely attached to the glass surface of a vehicle. To this end, the frame has a shape of a long bent metal plate.

The left and right spoilers 53 may be made of rubber or flexible plastic materials and have an inclined surface, thereby preventing the wiper blade from coming off the glass surface even when a vehicle is driven at high speed.

As described above, the adaptor 55 of the wiper blade is installed approximately at the center in a longitudinal direction of the frame to couple the wiper blade to the wiper arm of a vehicle. With respect to the type of wiper arm connected to the adaptor 55, there are various types, such as a hook type, a side pin type, etc. The adaptor 55 may be formed to connect to a specific type of wiper arm or various types of wiper arms, if necessary.

The heating element to heat the wiper blade is attached to the frame having the metal plate shape. Preferably, the heating element is a heating element having a film shape that can be used in the temperature range of approximately 30 to 40°, for example, a film heater.

The wiper blade 50 with the heating element may be electrically connected to a battery 13 of a vehicle through a controller (control unit) 30 and may be modified to receive power from a power supply unit such as a dedicated battery, etc., if necessary, in addition to a battery of a vehicle.

Meanwhile, whether power is supplied to the heating element may be recognized from the outside by installing a display unit such as an LED (not shown) at the outside of the wiper blade 50, for example, the outside of the end of the spoiler 53 or the adaptor 55, etc.

In addition, according to one embodiment of the present invention, the heating element may be manually turned-on or turned-off by the driver if necessary by including a passive switch in the controller 30.

Figure 3:
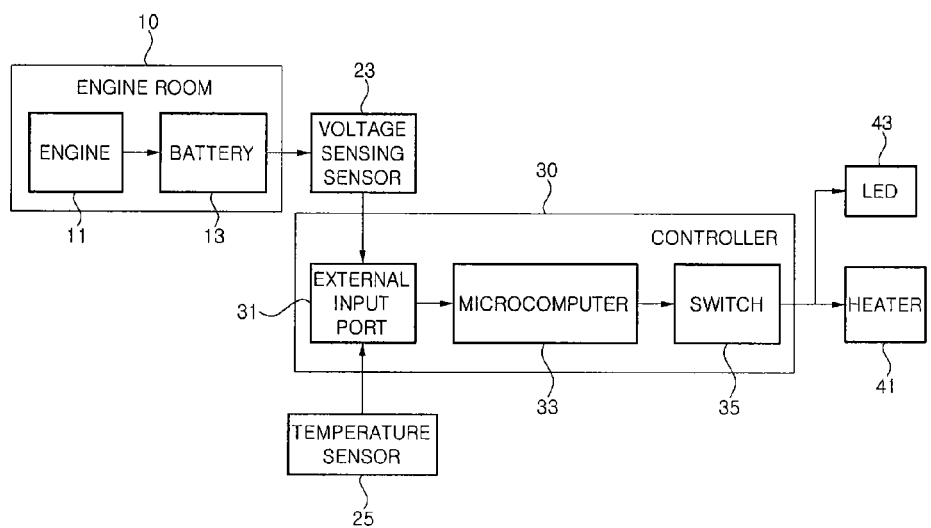
FIG. 3 is a block diagram for explaining a method of controlling the wiper blade with the heating elements according to one embodiment of the present invention.

Hereinafter, the method for controlling a wiper blade with the heating elements according to various embodiments of the present invention will be described with reference to FIG. 3. According to one embodiment of the present invention, the heating element installed in the wiper blade is configured to be automatically turned-on or turned-off while considering the operation or not of an engine and the temperature outside a vehicle.

When the driver starts an engine 11, the voltage of the battery 13 that is disposed in an engine room or engine compartment 10 together with the engine 11 is instantly increased to about 1 to 4V above normal. In other words, although each vehicle has differences, the voltage of the battery 13 that is generally maintained at 12V is increased at the time of starting the engine.

When a voltage sensing sensor 23 senses the voltage increasing phenomenon, the information is transferred a microcomputer 33 through an external input port 31 in the control unit (controller) 30.

Similar to the voltage information, the information regarding the temperature outside a vehicle detected by a temperature sensor 25 installed at a predetermined position of a vehicle is transferred to the microcomputer 33 through the external input port 31 in the control unit (controller) 30.

The microcomputer 33 determines a predetermined condition, for example, a condition where temperature becomes 0° C. or less while the engine is operated, etc., through the temperature information and the voltage information. When the condition is satisfied, a heater (heating element) 41 is operated by turning-on a switch 35.

The turning-off the operation of the heater (heating element) 41 may be performed by a method for automatically turning-off the switch when a predetermined time elapses after the operation, a method for automatically turning-off the switch by sensing when the operation of the engine stops, etc.

As described above, when the recognizable display device, for example, the LED 43 is installed outside the wiper blade 50, the LED is operated by the turning-on or turning-off of the heater 41.

According to various embodiments of the present invention, the wiper blade with the heating elements capable of automatically supplying power to the heating elements while considering the driving state of a vehicle, the external temperature, etc., and the method for controlling the wiper blade are provided.

With the wiper blade with the heating elements and the method for controlling the wiper blade, it can automatically control appropriately the heating elements if necessary while saving energy.

As described above, although the method for controlling the wiper blade with the heating elements according to exemplary embodiments of the present invention is described with reference to the accompanying drawings, the present invention is not limited to the above exemplary embodiments and drawings and thus, may be variously modified and changed by those skilled in the art to which the present invention pertains.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for controlling a wiper blade with at least one heating element embedded therein and coupled to a wiper arm of a vehicle to wipe a glass surface while moving together with the wiper arm, the method comprising:

detecting an operation or not of an engine of a vehicle;

detecting an external temperature adjacent the vehicle;

automatically supplying power to the at least one heating element based on the detected information of the operation of the engine and the temperature information; and displaying an operation state of the at least one heating element through a display device installed on the wiper blade.

2. The method for controlling a wiper blade with at least one heating element according to claim 1, wherein the operation or not of the engine is detected through the fluctuation in voltage of a battery that is mounted in an engine compartment of the vehicle together with the engine.

3. The method for controlling a wiper blade with at least one heating element according to claim 2, wherein the fluctuation in voltage of the battery is sensed by a voltage sensing sensor and is transferred to a microcomputer through an external input port in a controller.

4. The method for controlling a wiper blade with at least one heating element according to claim 1, wherein the external temperature information is detected by a temperature sensor and transferred to a microcomputer through an external input port in a controller.

5. The method for controlling a wiper blade with at least one heating element according to claim 1, wherein the information of the operation of the engine and the temperature information are transferred to a microcomputer in a controller and the microcomputer determines whether a switch is turned-on through the operation information and the temperature information.

6. The method for controlling a wiper blade with at least one heating element according to claim 1, wherein a switch is automatically turned-off by sensing when a predetermined time elapses after the operation of the at least one heating element or when the operation of the engine stops to end the operation of the at least one heating element.

7. A wiper blade including a rubber strip that contacts a glass surface to wipe the glass surface, a frame that is coupled with the rubber strip, and an adaptor that is coupled with the frame to connect to a wiper arm of a vehicle and wiping the glass surface while moving together with the wiper arm of the vehicle, the wiper blade comprising:

a heating element embedded in the wiper blade whose generation of heat is controlled by the control method according to claim 1.

8. The wiper blade according to claim 7, wherein the heating element is supplied with power from a battery installed in an engine compartment of the vehicle.

* * * * *